(12) United States Patent
Xu et al.

(10) Patent No.: US 11,309,780 B2
(45) Date of Patent: Apr. 19, 2022

(54) VIBRATION MOTOR

(71) Applicant: AAC Acoustic Technologies (Shenzhen) Co., Ltd., Shenzhen (CN)

(72) Inventors: Tongming Xu, Shenzhen (CN); Houwei Zhao, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 385 days.

(21) Appl. No.: 16/679,318

(22) Filed: Nov. 11, 2019

(65) Prior Publication Data
US 2020/0153324 A1 May 14, 2020

(30) Foreign Application Priority Data
Nov. 12, 2018 (CN) .......................... 201821858024.0

(51) Int. Cl.
*H02K 33/02* (2006.01)
*H02K 33/18* (2006.01)
*H02K 33/06* (2006.01)
*B06B 1/04* (2006.01)

(52) U.S. Cl.
CPC .............. *H02K 33/18* (2013.01); *H02K 33/02* (2013.01); *H02K 33/06* (2013.01); *B06B 1/045* (2013.01)

(58) Field of Classification Search
CPC .......... H02K 1/34; H02K 33/02; H02K 33/06; H02K 33/16; H02K 33/18; B06B 1/045
See application file for complete search history.

*Primary Examiner* — Ramon M Barrera
(74) *Attorney, Agent, or Firm* — W&G Law Group

(57) ABSTRACT

The vibration motor provided by the present disclosure includes an elastic assembly having an elastic frame, a first elastic supporting member, and a second elastic supporting member. The first and second elastic supporting members connects to the housing by the elastic frame. By virtue of the bended structure of the elastic frame, the first and the second elastic supporting members are arranged interlaced along the vibration direction, which greatly reduces the height of the vibration motor.

8 Claims, 4 Drawing Sheets

VIBRATION MOTOR

FIELD OF THE PRESENT DISCLOSURE

The present disclosure relates to the field of electromagnetic transducers, more particularly to a vibration motor used in a portable electronic device, for providing tactile feedback.

DESCRIPTION OF RELATED ART

With the rapid development of electronic technologies, portable electronic devices, such as mobile phones, handheld game consoles, portable navigators, and portable entertainment devices, are more and more popular to users. Such a device generally uses a vibration motor for providing tactile feedback. As the electronic device is thinner and thinner, the vibration motor inside the electronic device is also required to be thinner.

A related vibration motor includes a vibration unit and at last two elastic supporting members. For avoiding the noise produced by the vibration unit striking the housing, the elastic supporting members are such configured that one of the members is located right above the other, which makes the vibration motor have a greater height, and which is not beneficial to the requirement of thickness.

Therefore, an improved vibration motor is desired.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
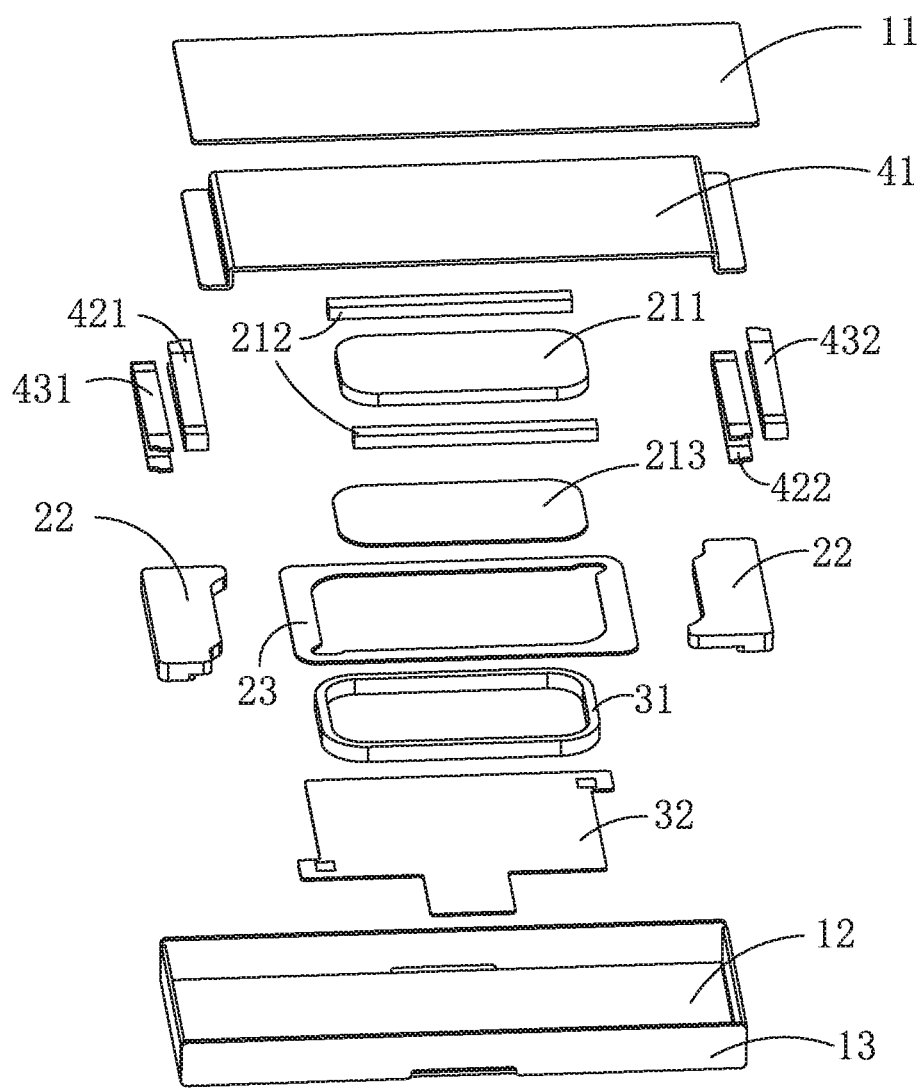
FIG. 1 is an isometric and exploded view of a vibration motor provided by the present disclosure.
Figure 2:
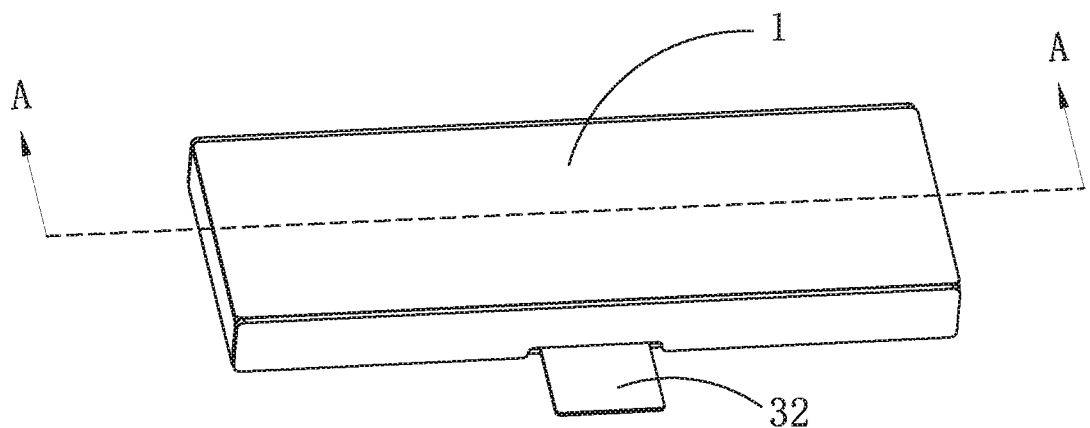
FIG. 2 is an isometric view of the vibration motor.
Figure 9:
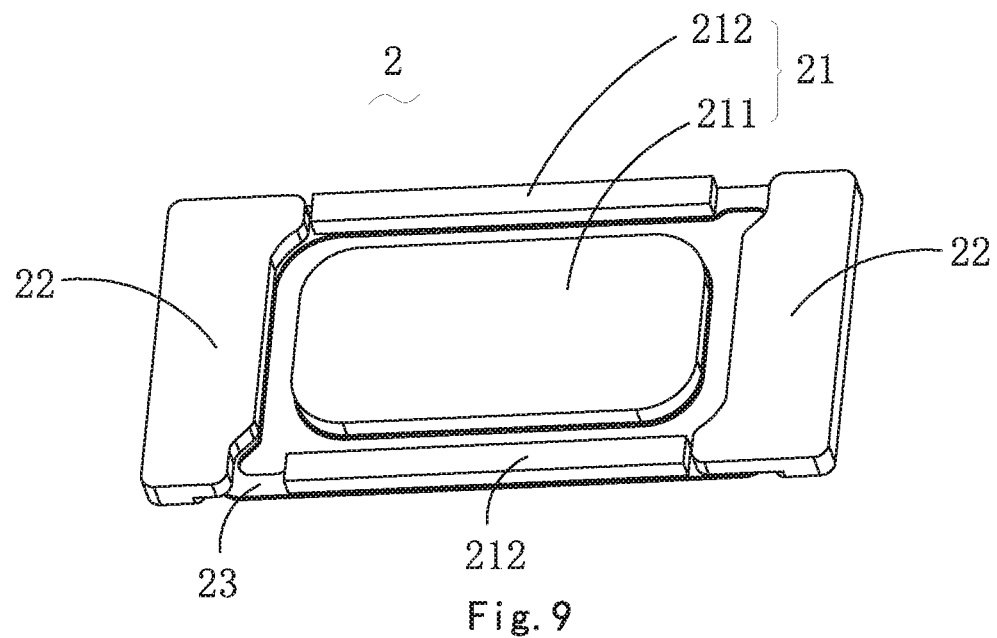
FIG. 9 is an isometric view of a vibration unit of the vibration motor provided by the present disclosure.

Referring to FIGS. 1-2, and 9, a vibration motor is provided by the present disclosure. The vibration motor includes a housing 1 with an accommodation space, a vibration unit 2 received in the accommodation space, a fixed part 3 assembled with the housing 1, and an elastic assembly 4 for elastically supporting the vibration unit 2. The housing 1 includes a cove plate 11, a bottom plate 12 opposite to the cover plate 11, and a side 13 for connecting the cover plate 11 to the bottom plate 12. The elastic assembly 4 comprises an elastic frame 41, a first elastic supporting member 42, and a second elastic supporting member 43.

Figure 3:
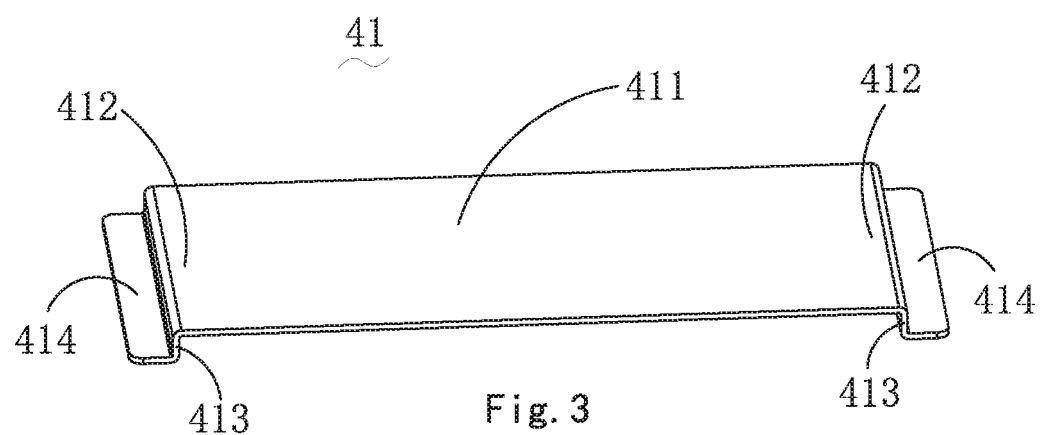
FIG. 3 is an isometric view of an elastic frame of the vibration motor.

Referring to FIG. 3, the elastic frame 41 includes a frame body 411 connecting to the vibration unit 2, a first fastening portion 412 extending from one end of the frame body 411, a connecting beam 413 extending from an end of the first positioning portion 412 along a direction away from the cover plate 11, and a second positioning portion 414 extending from an end of the connecting beam 413 along a direction away from the vibration unit 2. In the embodiment, two first positioning portions 412 are provided, and extend from two opposite ends of the frame body 411. Accordingly, corresponding to the first positioning portions 412, two connecting beams 413 and two second positioning portions 414 are respectively provided, as shown in FIG. 3.

The first elastic supporting member 42 has one end connected to the first fastening portion 412 of the elastic frame 41 and another end connected to the bottom plate 12. The second elastic supporting member 43 has one end connected to the second positioning portion 414 of the elastic supporting member 43 and another end connecting to the cover plate 11.

The first and second elastic supporting member 42, 43 are respectively disposed at two sides of the connecting beam 413, and each of the first and second elastic supporting member 42, 43 keeps a distance from the connecting beam 413.

Optionally, the first elastic supporting member 42 includes a first elastic unit 421 and a second elastic unit 422, and the second elastic supporting member 43 includes a third elastic unit 431 and a fourth elastic unit 432. In this embodiment, the first elastic supporting member 42 and the second elastic supporting member 43 are made of elastic sheet. It should be noted that the first elastic supporting member 42 or the second elastic supporting member 43 may be made of other material or has other form, provided that the first elastic supporting member 42 and the second elastic supporting member 43 are capable of elastically supporting the vibration unit 2.

Figure 4:
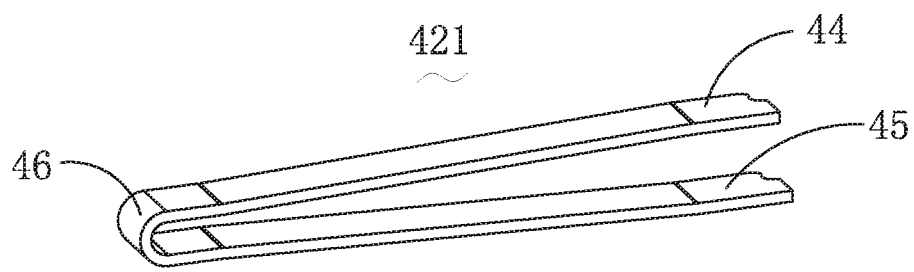
FIG. 4 is an isometric view of a first elastic member of the vibration motor.

The first elastic unit 421, the second elastic unit 422, the third elastic unit 431, and the fourth elastic unit 432 have the same structure, and each includes a first connecting portion 44, a second connecting portion 45, and an elastic arm connecting the first connecting portion 44 to the second connecting portion 45. Take the first elastic unit 421 as an example to describe the structure in detail, as illustrated in FIG. 4.

The first connecting portion 44 (421) of the first elastic unit 421 and the first connecting portion 44 (422) of the second elastic unit 422 connect to the first positioning portion 412 of the elastic frame 4; the second connecting portion 45 (421) of the first elastic unit 421 and the second connecting portion 45 (422) of the second elastic unit 422 connect to the bottom plate 12.

The first connecting portion 44 (431) of the third elastic unit 431 and the first connecting portion 44 (432) of the fourth elastic unit 432 connect to the cover plate 11; the second connecting portion 45 (431) of the third elastic unit 431 and the second connecting portion 45 (432) of the fourth elastic unit 432 connect to the second positioning portion 414 of the elastic frame 41.

Figure 5:
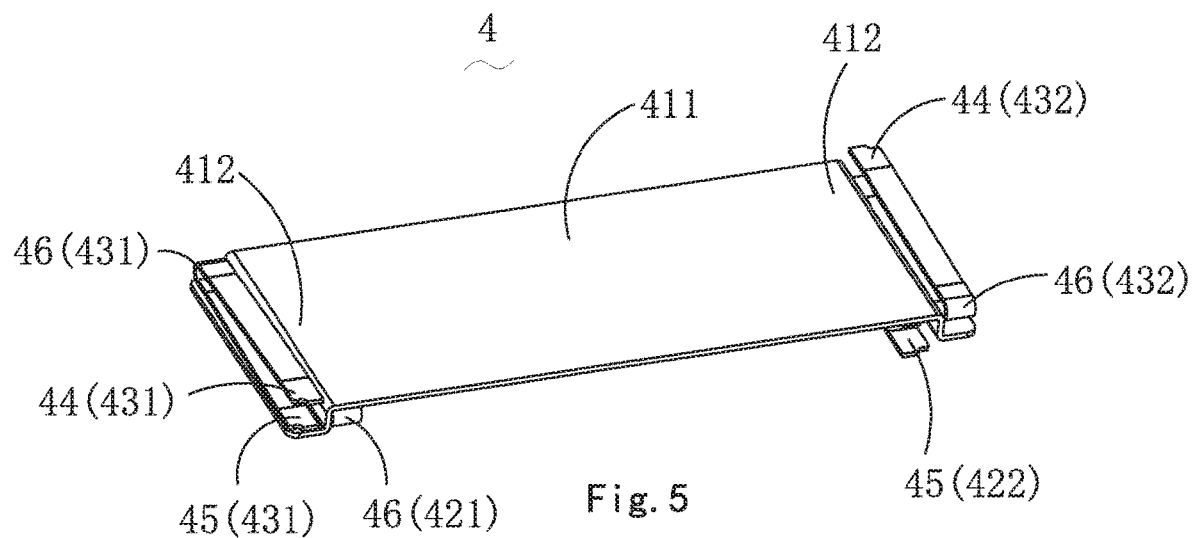
FIG. 5 is an isometric view of an elastic assembly, in accordance with Embodiment 1.
Figure 6:
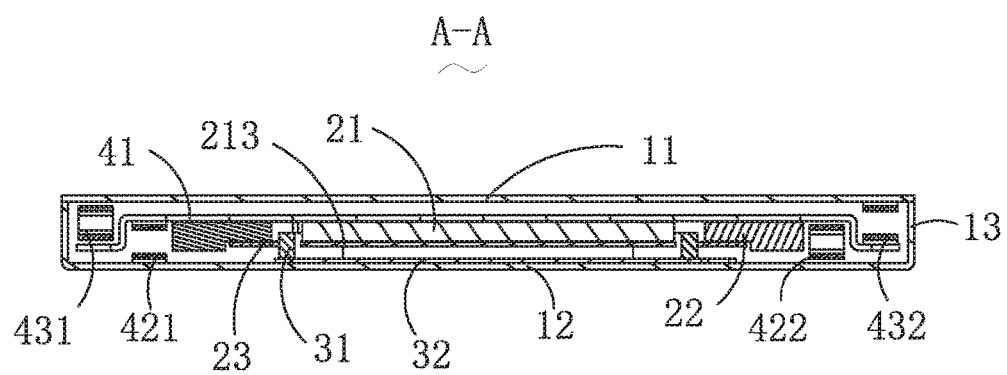
FIG. 6 is a cross-sectional view of the vibration motor in Embodiment 1, taken along line A-A in FIG. 2.

In the present embodiment, referring to FIGS. 5-6, the first elastic unit 421, the second elastic unit 422, the third elastic unit 431, and the fourth elastic unit 432 have the same configurations and all are V-shaped elastic sheets. When assembled, the first elastic unit 421 is arranged opposite to the third elastic unit 431, i.e., an open of the first elastic unit 421 is opposite to an open of the third elastic unit 431. Similarly, an open of the second elastic unit 422 is opposite to an open of the fourth elastic unit 432; and an open of the first elastic unit 421 is opposite to an open of the second elastic unit 422.

Referring to FIG. 9, the vibration unit 2 includes a magnet assembly 21, a weight 22 coupled to the magnet assembly 21, and a connecting member 23. The magnet assembly 21 includes a main magnet 211 and a pair of auxiliary magnets 212 located adjacent to the main magnet. In the embodiment, the two auxiliary magnets are located at two sides of the main magnet 211. The connecting member 23 is used for connecting the auxiliary magnets 212 to the weight 22. A pole plate 213 made of magnetic conductive material is attached to a top of the main magnet 211 for effectively sealing the magnetic field and reducing leakage flux. A magnetic gap is formed between the auxiliary magnets 212 and the main magnet 211.

The fixing part 3 includes a voice coil 31 partially received in the magnetic gap and a circuit board 32 mounted between the housing 1 and the voice coil 31. Both the voice coil 31 and the circuit board 32 are fixedly mounted with the housing 1. The voice coil 31 is electrically connected with the circuit board 32. When the voice coil 31 receives the electrical signals from the circuit board 32, an Ampere Force is produced by virtue of the interaction between the magnetic field and the electrified voice coil 31 for driving the vibration unit 2 to perform reciprocating vibration along a direction perpendicular to vibration unit 2 (a z-axis movement).

The elastic frame 41 is arranged opposite to the connecting member 23. The connecting member 23 is arranged on a side of the vibration unit 2 adjacent to the bottom plate 12. The elastic frame 41 is coupled to a side of the vibration unit 2 adjacent to the cover plate 11.

Referring to FIG. 6, in the embodiment, the voice coil 31 and the circuit board 32 are both fixed with the bottom plate 12, and the connecting member 23 is a ring-shape and surrounds the voice coil 31.

Embodiment 2

Figure 7:
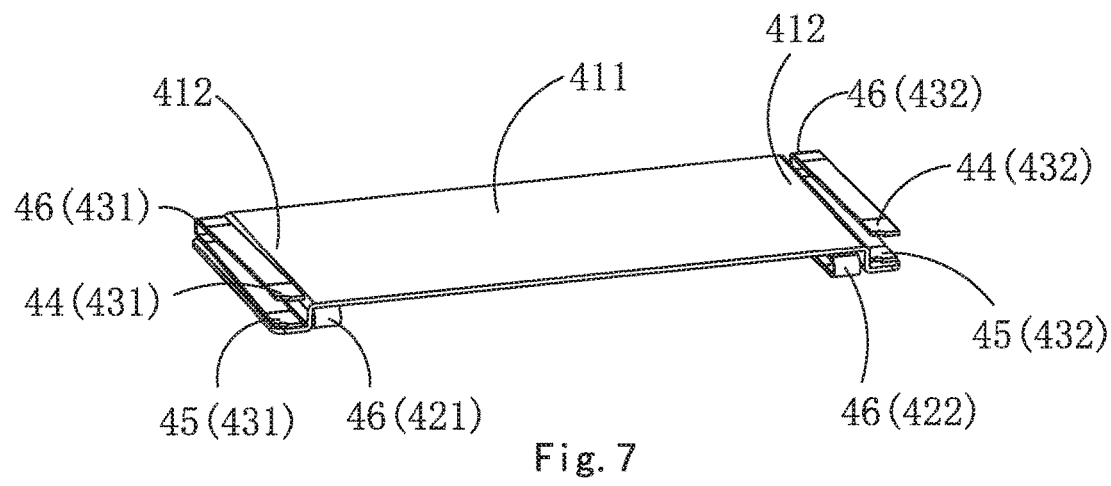
FIG. 7 is an isometric view of an elastic assembly, in accordance with Embodiment 2.

Referring to FIG. 7, a vibration motor in accordance with another embodiment is disclosed. The first elastic unit 421 is arranged opposite to the third elastic unit 431, i.e., an open of the first elastic unit 421 is opposite to an open of the third elastic unit 431. Similarly, an open of the second elastic unit 422 is opposite to an open of the fourth elastic unit 432; and an open of the first elastic unit 421 orients toward a direction same to the second elastic unit 422.

Embodiment 3

Figure 8:
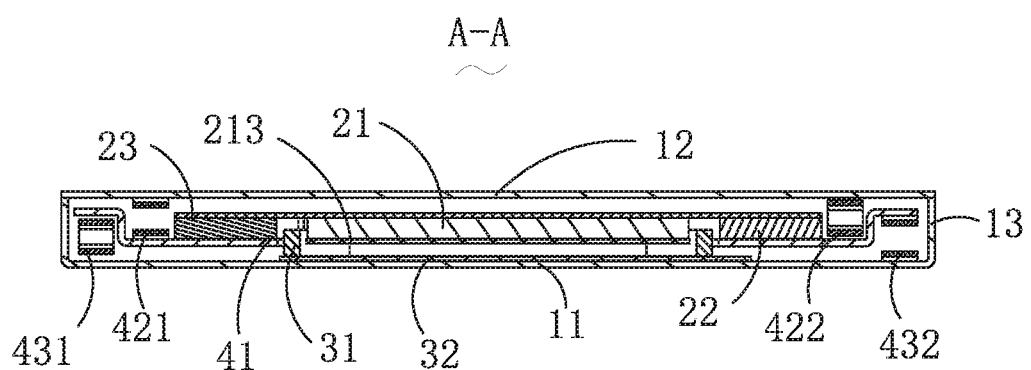
FIG. 8 is a cross-sectional view of a vibration motor in accordance with Embodiment 3, taken along line A-A in FIG. 2.

Referring to FIG. 8, a vibration motor in accordance with another embodiment is disclosed. What is different from Embodiment 1 is that the voice coil 31 and the circuit board 32 are both fixedly mounted on the cover plate 11, and the elastic frame 41 is ring-shape for surrounding the voice coil 31.

Briefly, the vibration motor provided by the present disclosure includes an elastic assembly having an elastic frame, a first elastic supporting member, and a second elastic supporting member. The first and second elastic supporting members connects to the housing by the elastic frame. By virtue of the bended structure of the elastic frame, the first and the second elastic supporting members are arranged interlaced along the vibration direction, which greatly reduces the height of the vibration motor.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor, comprising:
   a housing with an accommodation space, including a cover plate, a bottom plate opposite to the cover plate, and a side for connecting the cover plate to the bottom plate;
   a vibration unit accommodated in the accommodation space;
   a fixing part fixedly assembled with the housing;
   an elastic assembly for elastically supporting the vibration unit, including an elastic frame, a first elastic supporting member, and a second elastic supporting member; wherein
   the elastic frame includes a frame body connected to the vibration unit, a first positioning portion extending from two ends of the frame body, a connecting beam extending from an end of the first positioning portion along a direction away from the cover plate, and a second positioning portion extending from an end of the connecting beam along a direction away from the vibration unit;
   one end of the first elastic supporting member connects to the first positioning portion of the elastic frame, another end of the first elastic supporting member connects to the bottom plate;
   one end of the second elastic supporting member connects to the second positioning portion of the elastic frame, another end of the second elastic supporting member connects to the cover plate;
   the first and second elastic supporting members locate at two sides of the connecting beam and each keeps a distance from the connecting beam.

2. The vibration motor as described in claim 1, wherein the first elastic supporting member includes a first elastic unit and a second elastic unit, and the second elastic supporting member includes a third elastic unit and a fourth elastic unit;
   the first elastic unit, the second elastic unit, the third elastic unit, and the fourth elastic unit have the same structure, and each includes a first connecting portion, a second connecting portion, and an elastic arm connecting the first connecting portion to the second connecting portion;
   the first connecting portion of the first elastic unit and the first connecting portion of the second elastic unit connect to the first positioning portion of the elastic frame; the second connecting portion of the first elastic unit and the second connecting portion of the second elastic unit connect to the bottom plate;

the first connecting portion of the third elastic unit and the first connecting portion of the fourth elastic unit connect to the cover plate; the second connecting portion of the third elastic unit and the second connecting portion of the fourth elastic unit connect to the second positioning portion of the elastic frame.

3. The vibration motor as described in claim 2, wherein the first elastic unit, the second elastic unit, the third elastic unit, and the fourth elastic unit have the same configurations and all are V-shaped elastic sheets; an open of the first elastic unit is opposite to an open of the third elastic unit; an open of the second elastic unit is opposite to an open of the fourth elastic unit; and an open of the first elastic unit is opposite to an open of the second elastic unit.

4. The vibration motor as described in claim 2, wherein the first elastic unit, the second elastic unit, the third elastic unit, and the fourth elastic unit have the same configurations and all are V-shaped elastic sheets; an open of the first elastic unit is opposite to an open of the third elastic unit; an open of the second elastic unit is opposite to an open of the fourth elastic unit; and an open of the first elastic unit orients toward a direction same to the second elastic unit.

5. The vibration motor as described in claim 1, wherein the vibration unit includes a magnet assembly, a weight coupled to the magnet assembly, and a connecting member; the magnet assembly includes a main magnet and a pair of auxiliary magnets located at two sides of the main magnet; the connecting member is used for connecting the auxiliary magnets to the weight;

the elastic frame is arranged opposite to the connecting member; the connecting member is arranged on a side of the vibration unit adjacent to the bottom plate; the elastic frame is coupled to a side of the vibration unit adjacent to the cover plate.

6. The vibration motor as described in claim 5, wherein the fixed portion includes a voice coil assembled with the housing, and a magnetic gap is formed between the main magnet and the auxiliary magnets for receiving the voice coil.

7. The vibration motor as described in claim 6, wherein the voice coil is fixed on the bottom plate, and the connecting member is ring-shaped and surrounds the voice coil.

8. The vibration motor as described in claim 6, wherein the voice coil is fixed on the cover plate, the elastic frame is ring-shaped and surrounds the voice coil.

* * * * *